(12) United States Patent
Walter

(10) Patent No.: US 10,612,265 B1
(45) Date of Patent: Apr. 7, 2020

(54) FLIP-OVER PORTABLE SHELTER

(71) Applicant: CLAM CORPORATION, Rogers, MN (US)

(72) Inventor: Thomas A. Walter, Cologne, MN (US)

(73) Assignee: Clam Corporation, Rogers, MN (US)

( * ) Notice: Subject to any disclaimer, the term of this patent is extended or adjusted under 35 U.S.C. 154(b) by 0 days.

(21) Appl. No.: 16/383,061

(22) Filed: Apr. 12, 2019

(51) Int. Cl.
*E04H 15/38* (2006.01)
*E04H 15/48* (2006.01)
*E04H 15/56* (2006.01)
*E04H 15/00* (2006.01)
*A01M 31/02* (2006.01)

(52) U.S. Cl.
CPC ........... *E04H 15/001* (2013.01); *E04H 15/38* (2013.01); *E04H 15/48* (2013.01); *E04H 15/56* (2013.01); *A01M 31/025* (2013.01)

(58) Field of Classification Search
CPC ....... E04H 15/001; E04H 15/38; E04H 15/56; A01M 31/025
See application file for complete search history.

(56) References Cited

U.S. PATENT DOCUMENTS

| | | | | |
|---|---|---|---|---|
| 4,938,243 A * | 7/1990 | Foster | ................... | E04H 15/001 135/128 |
| 5,368,057 A * | 11/1994 | Lubkeman | ............ | E04H 15/001 135/133 |
| 6,802,327 B2 * | 10/2004 | Koss | ........................ | E04H 15/06 135/137 |
| 7,665,478 B2 * | 2/2010 | Wehner | ..................... | A01G 9/16 135/126 |
| 8,915,258 B1 * | 12/2014 | Beam | ..................... | E04H 15/001 135/117 |
| 9,194,153 B2 * | 11/2015 | Makos | ..................... | E04H 15/38 |
| 9,394,718 B1 * | 7/2016 | Hill | ......................... | E04H 15/001 |
| 9,644,387 B2 * | 5/2017 | Makos | ..................... | E04H 15/38 |
| 9,863,163 B2 * | 1/2018 | Lonergan | ............... | E04H 15/001 |
| 9,976,318 B2 * | 5/2018 | Lynch | ..................... | E04H 15/40 |
| 10,058,181 B2 * | 8/2018 | Makos | ..................... | A47C 4/52 |
| 10,138,653 B1 * | 11/2018 | Weber | ..................... | E04H 15/54 |
| 2005/0287881 A1 * | 12/2005 | Hill | ..................... | B62D 49/0671 440/25 |
| 2006/0169729 A1 * | 8/2006 | Reis | .......................... | A45F 4/04 224/154 |
| 2006/0238005 A1 * | 10/2006 | Walter | ................... | A01K 97/01 297/218.2 |
| 2009/0320893 A1 * | 12/2009 | Engstrom | ............. | E04H 15/001 135/96 |
| 2011/0168221 A1 * | 7/2011 | Schlipf | ................. | E04H 15/001 135/143 |
| 2013/0074894 A1 * | 3/2013 | Cook | ...................... | E04H 15/54 135/96 |
| 2013/0276382 A1 * | 10/2013 | Workman | ............... | E04H 15/44 52/63 |

(Continued)

*Primary Examiner* — David R Dunn
*Assistant Examiner* — Danielle Jackson
(74) *Attorney, Agent, or Firm* — Cook Alex Ltd.

(57) ABSTRACT

A flip-over portable shelter that includes a sled, a flip-over frame assembly and an outer covering. The flip-over frame assembly is pivotally connected to the sled and the outer covering includes an enlarged doorway that wraps around a corner for access through two adjacent walls, without obstruction by the flip-over frame assembly. The flip-over portable shelter also optionally includes a removable floor.

19 Claims, 15 Drawing Sheets

(56) References Cited

U.S. PATENT DOCUMENTS

| | | | |
|---|---|---|---|
| 2014/0202509 A1* | 7/2014 | Schamberger | E04H 15/001 |
| | | | 135/96 |
| 2017/0234029 A1* | 8/2017 | Walter | E04H 15/54 |
| | | | 135/147 |
| 2019/0203500 A1* | 7/2019 | Lahood | E04H 15/48 |

* cited by examiner

FLIP-OVER PORTABLE SHELTER

BACKGROUND OF THE INVENTION

Field of the Invention

The present invention generally relates to flip-over portable shelters, such as are used for ice fishing, and more particularly to flip-over portable shelters optionally having more convenient ingress and egress and/or a removable floor.

Discussion of the Prior Art

Certain portable shelters that are used for ice fishing are known as flip-over portable shelters. Such shelters typically include a sled that forms a base and may include seating connected to the sled to accommodate one or more users. The shelter further includes a frame that may be grasped by a user and "flipped over" the user's head to move from overlying the sled to extending outward from the sled to form a backbone or erected frame for the portable shelter. An outer covering, typically constructed of fabric, such as canvas, polyester, nylon or the like, extends over the erected frame to define an enclosure and to shield the one or more users from the outdoor environment.

Flip-over portable shelters commonly have had one or more relatively narrow, upright opening that serves as a doorway in the outer covering. The opening or doorway is located in an individual generally upright and planar wall or panel of the outer covering, such as in a front wall or side wall. The narrow doorway tends to make ingress and egress somewhat difficult and inconvenient.

While many constructions for an outer covering exist, the shelters typically include a plurality of generally upright and planar side walls or panels, with each side wall connected to adjacent side walls and to a top wall. Also, such side and top walls of an outer covering may be of continuous construction or constructed of a plurality of connected separate walls or panels. Once erected and with the outer covering in place, the flip-over portable shelter is free standing. Such portable shelters generally are sized to accommodate the one or two users and their gear, but they certainly may provide larger configurations.

Flip-over portable shelters may be subjected to very cold temperatures, rain or water, snow, sun, high winds, and in some instances may be subjected to extreme heat or even be located in the close vicinity of a source of heat or fire. To meet these challenging conditions, the fabrics for panels used as side walls and top walls may be constructed to be flame resistant and/or to include some form of insulation, so as to improve the safety and comfort available to shelter users. However, retention of heat within a flip-over portable shelter can result in melting of the ice bounded by the shelter side walls and the sled, leaving undesirable standing water within the shelter's occupied space around the sled.

SUMMARY OF THE INVENTION

The purpose and advantages of the invention will be set forth in and apparent from the description and drawings that follow, as well as will be learned by practice of the claimed subject matter.

This disclosure generally provides a flip-over portable shelter having advantageous doorway openings that extend around corners to permit enlarged and more convenient ingress and egress, without interference by the structure of the underlying flip-over frame assembly. Also disclosed is a removable floor for a flip-over portable shelter that provides desirable advantages and yet may be easily and conveniently connected to and transported with the flip-over portable shelter.

The removable floor features a construction having multiple layers. The multiple layers may collectively provide water resistance, as well as insulation properties. To accommodate ice fishing, the removable floor construction includes pre-cut apertures having overlying patches or flaps, thereby avoiding permanently exposed openings. The pre-cut apertures provide convenient selective access to the ice. The floor also may be connected to the sled and connected to the flip-over frame assembly. The connections to the sled and frame assembly may be by respective fasteners that keep the floor spread out and provide for convenient installation and secure connection.

The compact assembly disclosed herein is particularly advantageous for ease of transportation, set up and use of a highly advantageous flip-over portable shelter. The larger doorway openings permit greater and more convenient access, while the removable floor resists melting of the ice below the floor and resists water intrusion both between layers and on top of the layered floor. The removable floor also offers convenient optional openings having flaps to cover the ice or holes while not fishing. The collective assembly permits the entirety of the portable shelter to be conveniently carried by the sled when in a collapsed position, as well as moved with the sled when in an erected position.

In a first aspect, this disclosure provides a flip-over portable shelter that includes a sled, a flip-over frame assembly and an outer covering. The sled includes a bottom being connected to upward extending opposed front and rear end walls and to upward extending opposed first and second side walls. The flip-over frame assembly includes a plurality of frame members being pivotally connected to the sled, at least one of which is a ground engaging frame member, with the plurality of frame members being moveable from a collapsed position overlying the sled to an erected position defining a space that is over the sled and extends outward from the sled in a first direction beyond the upward extending first side wall of the sled to the ground engaging frame member. The outer covering being connected to the flip-over frame assembly and enclosing the sled and the space defined by the flip-over frame assembly when the flip-over frame assembly is in the erected position, with the outer covering including a top wall, an upward extending first side wall that extends from the ground engaging frame member to the top wall, upward extending front and rear end walls that extend from the ground engaging frame member to the top wall and an upward extending second side wall that extends from the sled to the top wall, and further including a door at a doorway that is defined by an opening having upper and lower edge portions extending from an upward extending edge portion in the first side wall to an upward extending edge portion in the front end wall.

In a second aspect, this disclosure provides a flip-over portable shelter that includes a sled, a flip-over frame assembly, an outer covering and a removable floor. The sled includes a bottom being connected to upward extending opposed front and rear end walls and to upward extending opposed first and second side walls, with the upward extending first side wall of the sled further comprising at least one outward facing fastener. The flip-over frame assembly includes a plurality of frame members being pivotally connected to the sled, at least one of which is a ground engaging frame member, with the plurality of frame members being moveable from a collapsed position overlying the sled to an erected position defining a space that is over the sled and extends outward from the sled in a first direction beyond the upward extending first side wall of the sled to the ground engaging frame member. The outer covering being connected to the flip-over frame assembly and enclosing the sled and the space defined by the flip-over frame assembly when the flip-over frame assembly is in the erected position. The removable floor includes a central section defining a ground engaging area and including at least an upper layer constructed of a non-permeable material and having an upper surface, and a lower layer constructed of a non-permeable material and having a ground engaging lower surface, with the central section of the removable floor being connected to upward extending opposed front and rear end walls and to upward extending opposed first and second side walls. The upward extending opposed front and rear end walls and upward extending opposed first and second side walls of the removable floor further include at least one layer constructed of non-permeable material, and the upward extending first side wall of the removable floor includes at least one outward facing fastener configured to be connected to the respective at least one outward facing fastener of the upward extending first side wall of the sled. Each of the upward extending opposed front and rear end walls and the upward extending second side wall of the removable floor also include at least one fastener configured to be connected to the ground engaging frame member of the flip-over frame assembly. The central section of the removable floor further includes at least one opening defined by an area where the upper layer is sealed to the lower layer, and a central section fastener is connected to the upper surface of the upper layer of the central section and is located proximate the at least one opening, and at least one patch having an upper surface and a lower surface, and having a patch fastener connected to the lower surface of the patch and being releasably connected to the central section fastener located proximate the at least one opening.

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

Figure 1:
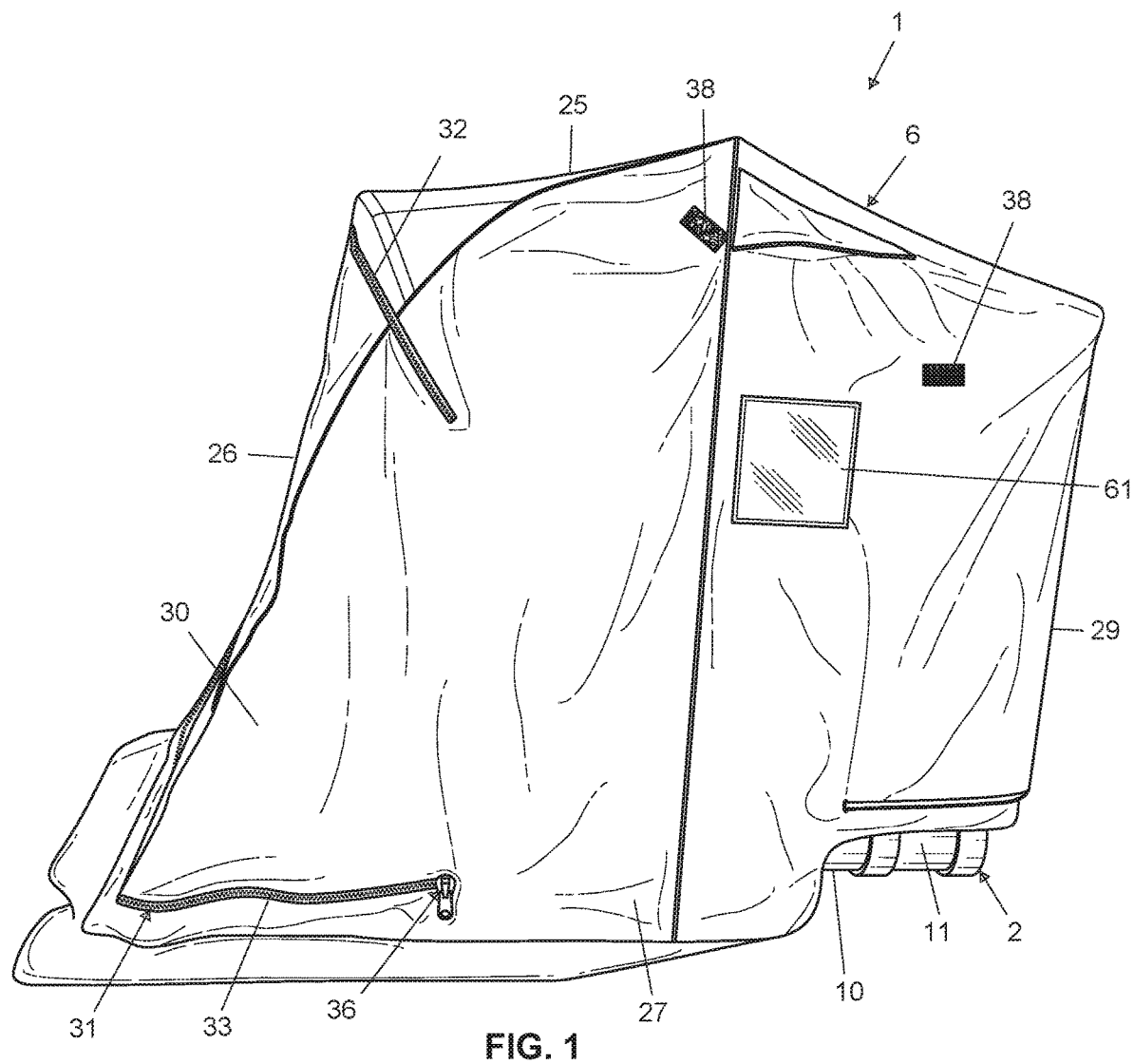
FIG. 1 is a perspective view of a first example flip-over portable shelter having a sled, being erected, and having a closed outer covering.
Figure 2:
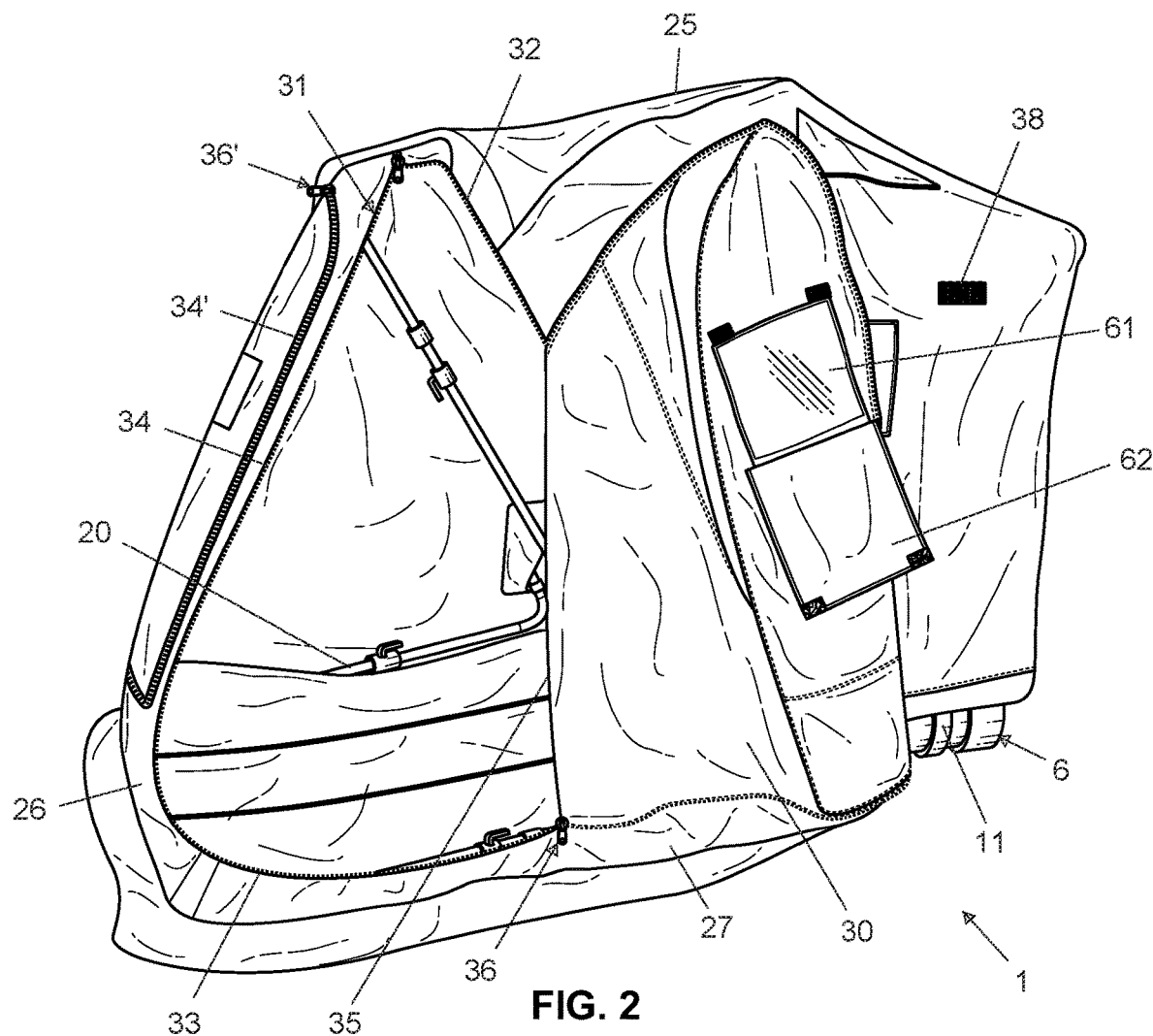
FIG. 2 is a perspective view of the example shelter of FIG. 1, showing a first shelter door associated with a first door opening that spans across a first side wall and a portion of the front end wall with the door folded toward the front end wall, and showing a removable floor.

It should be understood that the drawings are not to scale. While some mechanical details of example portable shelters and floors, including other plan and section views of the examples shown and of examples that may have alternative configurations, have not been included, such details are considered well within the comprehension of those of skill in the art in light of the present disclosure. It also should be understood that the present invention is not limited to the example embodiments illustrated.

DETAILED DESCRIPTION OF THE PREFERRED EMBODIMENTS

For the following defined terms, these definitions shall be applied, unless a different definition is given in the claims or elsewhere in this disclosure. As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

Referring generally to FIGS. 1-16, it will be appreciated that flip-over portable shelter constructions and methods of making the same having more convenient ingress and egress through a larger doorway, as well as a removable floor of the present disclosure generally may be embodied within numerous configurations, and may be used in various ways to alter and enhance the comfort and convenience of users. Indeed, while acknowledging that all of the example configurations of shelters need not be shown herein, examples are provided to better demonstrate that a variety of configurations and methods are contemplated.

Turning to FIGS. 1-10B, a first example embodiment of a flip-over portable shelter 1 is shown in an erected position for use. The flip-over portable shelter 1 includes a sled 2, a flip-over frame assembly 4 and an outer covering 6. In this example, the shelter 1 also includes an optional removable floor 8. The sled 2 provides for ease of transporting the flip-over portable shelter 1 and includes a bottom 10 that is connected to upward extending opposed front and rear end walls 11, 12, respectively, and to upward extending opposed first and second side walls 13, 14, respectively.

Figure 6:
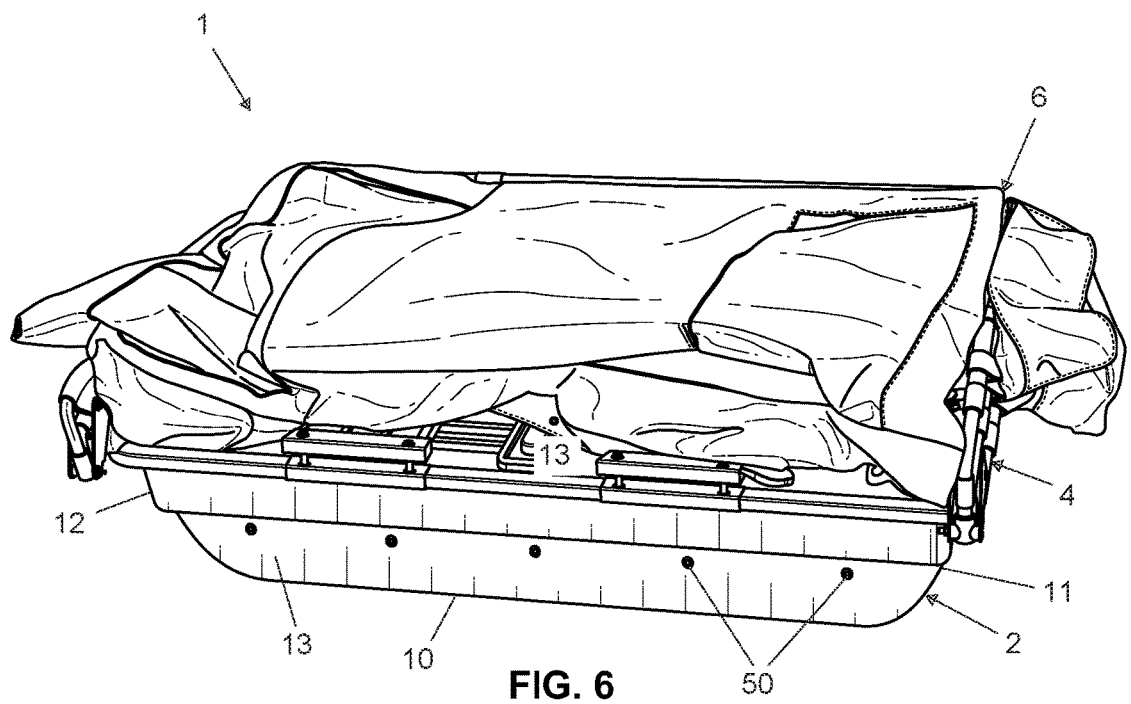
FIG. 6 is a perspective view of the example portable shelter of FIGS. 1-5 in a collapsed position with the removable floor, frame and outer covering stacked atop the sled for convenient transportation of the flip-over portable shelter.

As seen in FIG. 6, the entire shelter 1 may be moved to a collapsed position atop the sled 2 for moving the shelter 1 before or after use. It also will be appreciated that the shelter 1 may be easily moved after being erected, such as is shown in FIGS. 1-4 and 7, by moving the sled 2 to a new location. The sled 2 also may provide space for carrying fishing or other gear, and may support one or more seats 15, at least one tray 16 or other items to enhance the comfort and convenience of one or more users.

The flip-over frame assembly 4 includes a plurality of frame members 17, 18, 19, 20, respectively, that are pivotally connected to the sled 2. The plurality of frame members 17, 18, 19, 20 may be generally U-shaped rigid members, such as may be constructed of metal, plastic or composite tubing, rods or the like. The distal ends of the legs of the generally U-shaped frame members 17, 18, 19, 20 may be pivotally connected to the sled 2 via pivotal connection to brackets 21 that are mounted to the sled 2 proximate the front and rear end walls 11, 12. In the example shown in FIGS. 7-9, three of the frame members 17, 18, 19 may be used in an erected position to support the outer covering 6, while the fourth frame member 20 extends outward from the sled 2 in a first direction and serves as a ground engaging frame member 20. As will be appreciated in FIGS. 6-7, the plurality of frame members 17, 18, 19, 20 are movable from a collapsed position overlying the sled 2 as seen in FIG. 6 to an erected position defining a space that is over the sled 2 and extends outward from the sled 2 in the first direction beyond the upward extending first side wall 13 of the sled 2 to the ground engaging frame member 20.

Figure 7:
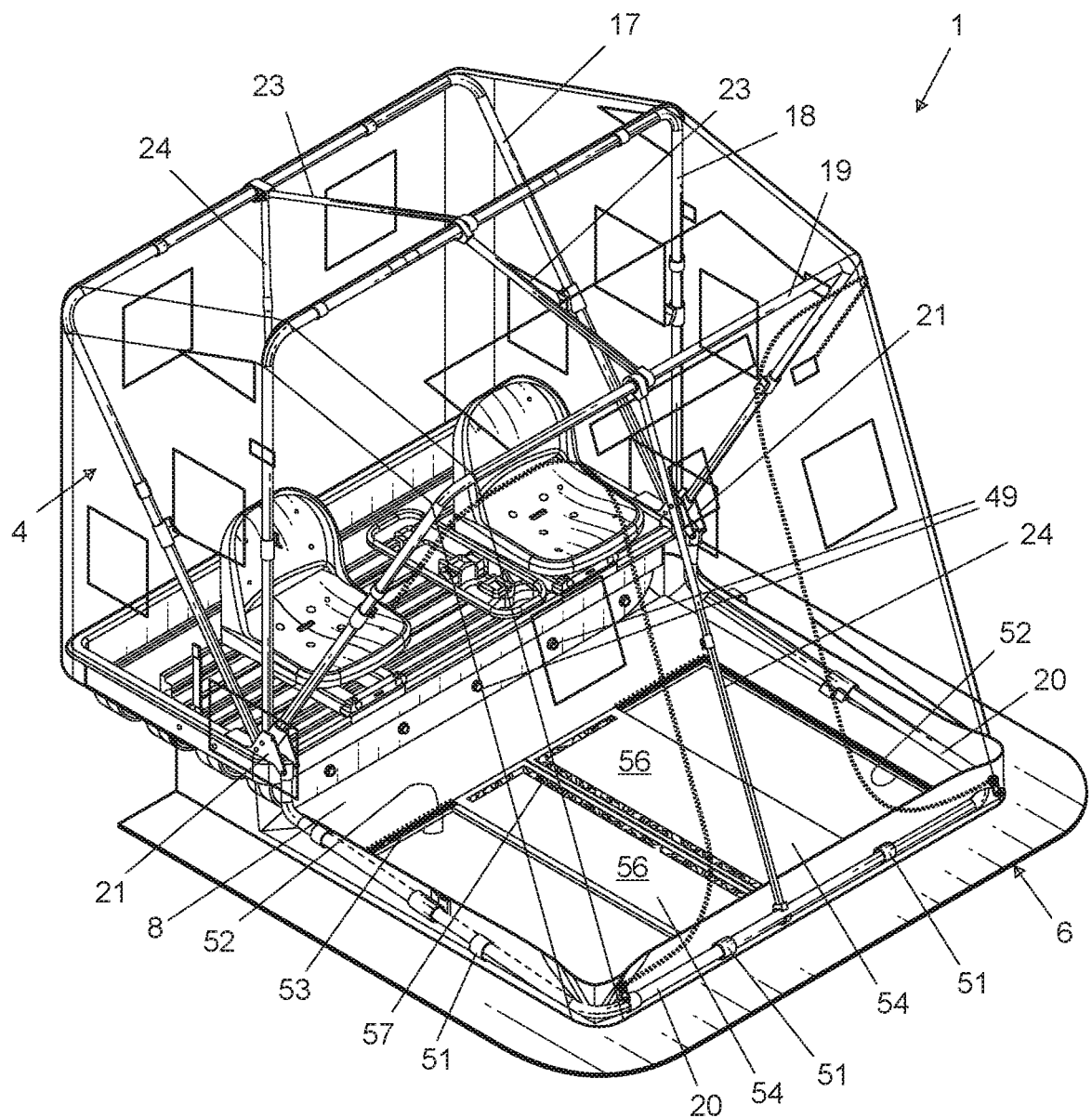
FIG. 7 is a perspective view of the portable shelter of FIGS. 1-6 showing the outer covering as transparent to better view the sled, erected flip-over frame assembly and removable floor, when the portable shelter is in an erected position, and includes use of separator poles to help provide rigidity to the frame assembly.
Figure 8:
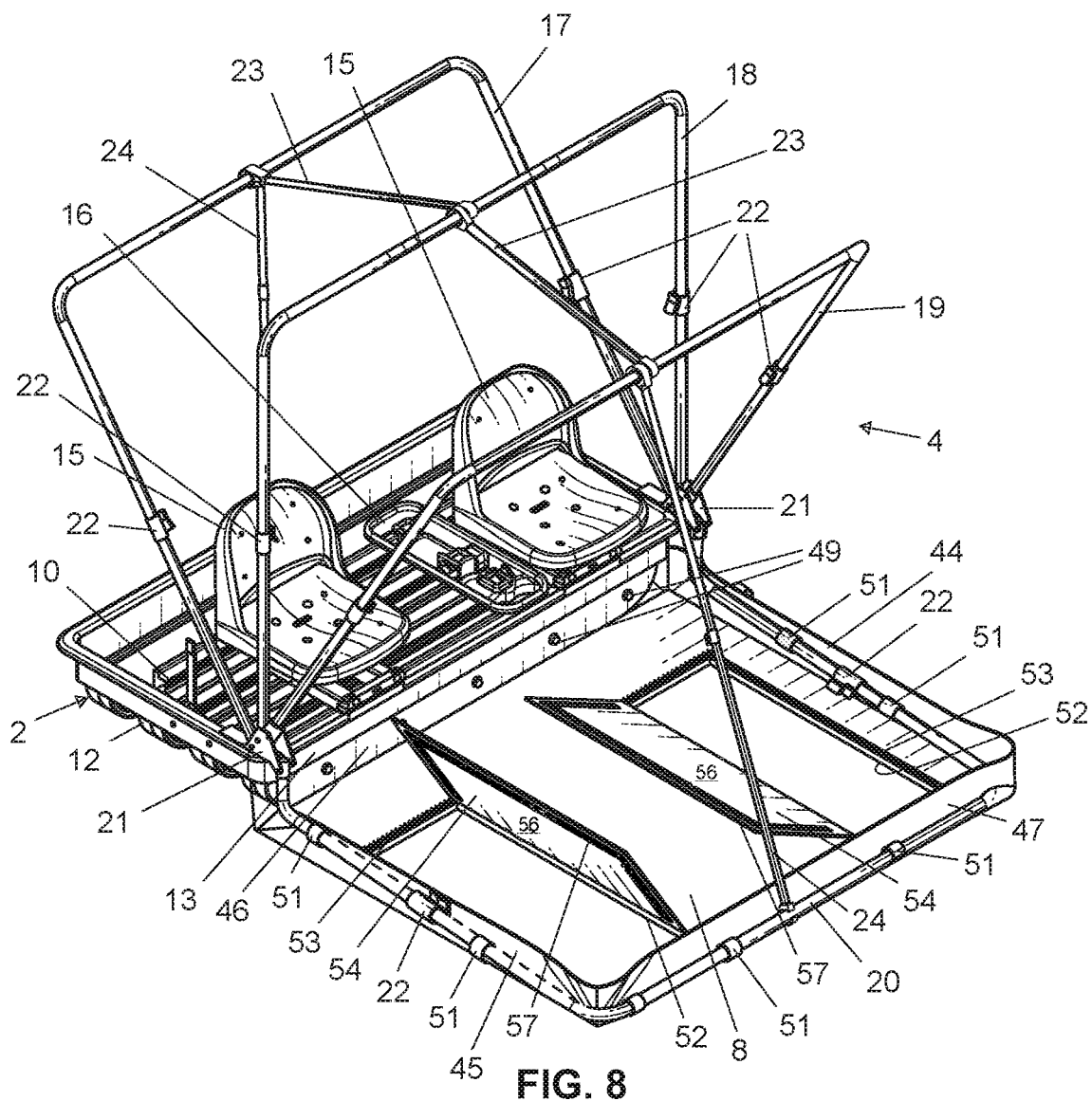
FIG. 8 is perspective view of the sled, flip-over frame assembly and removable floor of the portable shelter of FIGS. 1-7, but without the outer covering, and showing the floor flaps being moved to an open position.
Figure 9:
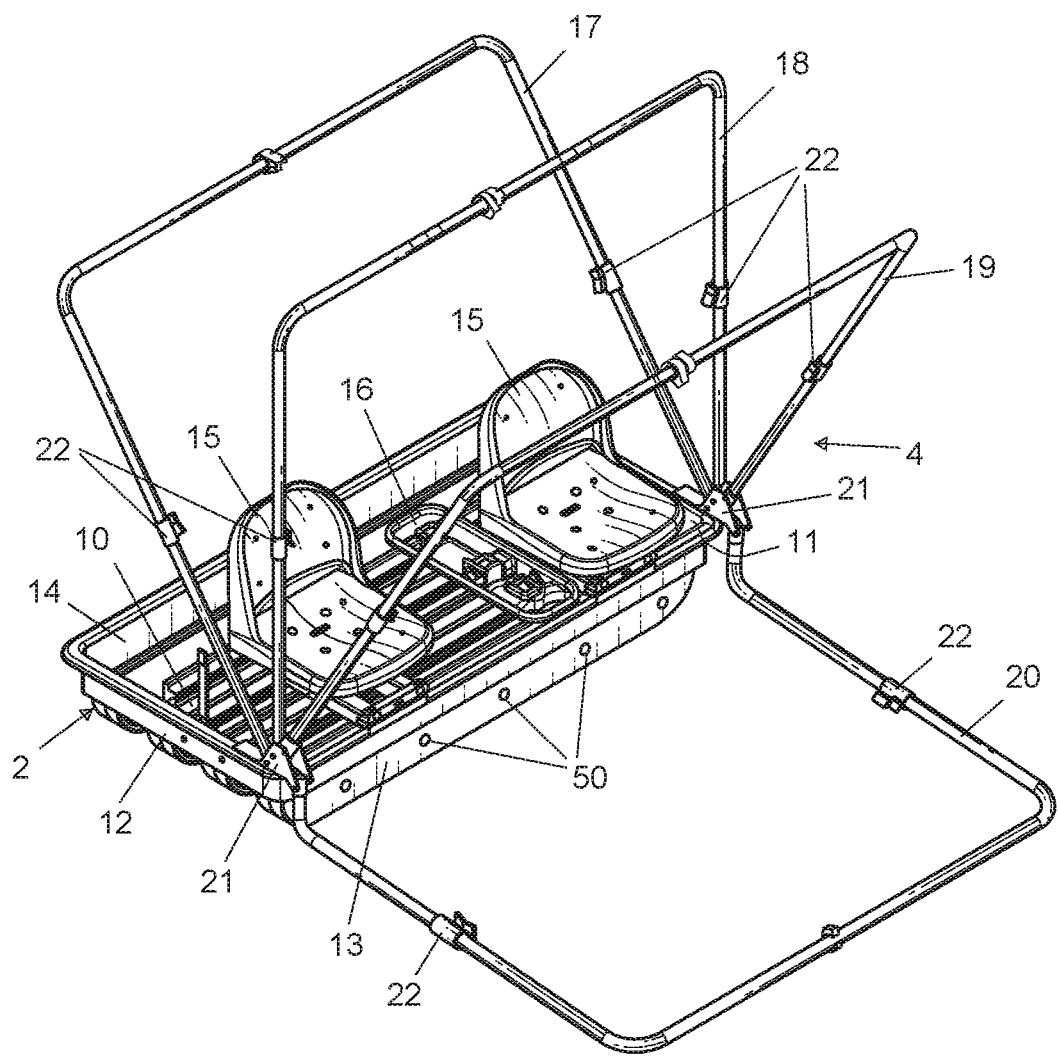
FIG. 9 is a perspective view of the sled and flip-over frame assembly of the portable shelter of FIGS. 1-8 in an erected position.

As will be appreciated in FIG. 9, the frame members 17, 18, 19, 20 are telescopically expandable by use of locking assemblies 22, which enable the frame assembly 4 to achieve a very compact configuration when in a collapsed position, as seen in FIG. 6, as well as an expanded configuration to support the outer covering 16 when in an erected position, as seen in FIG. 7. Optional long spacer poles 23 and short spacer poles 24 may be used to add rigidity to the erected flip-over frame assembly 4, as seen in FIGS. 7 and 8.

With respect to the outer covering 6, it is connected to the flip-over frame assembly 4 and encloses the sled 2 and the space defined by the flip-over frame assembly 4 when the flip-over frame assembly 4 is in the erected position. The outer covering 6 includes a top wall 25, an upward extending first side wall 26 that extends from the ground engaging frame member 20 to the top wall 25, upward extending front and rear end walls 27, 28 that each extend from the ground engaging frame member 20 to the top wall 25, and an upward extending second side wall 29 that extends from the sled 2 to the top wall 25. It will be appreciated that all of the connected walls of the outer covering 6 may be separately formed and then connected, such as by sewing, welding, adhesive or by other suitable means of connection, or some or all of the walls may be connected by being part of a continuous piece of a suitable material. For example, the material may be a fabric or any suitable sheet material, preferably being flame resistant, and optionally constructed with layers including an insulation layer, but may include canvas, polyester, nylon or other the like.

The outer covering 6 also includes a door 30 at a doorway 31 that is defined by an opening having upper and lower edge portions 32, 33 extending from an upward extending edge portion 34 in the first side wall 26 to an upward extending edge portion 35 in the front end wall 27.

It will be appreciated that with this first example flip-over portable shelter 1, the door 30 is connected to the doorway 31 in the outer covering 6 at the upward extending edge portion 35 in the front end wall 27. Indeed, the door 30 is constructed in this example as a flap connected to the outer covering 6 via a fold or integral hinge in the outer covering 6 at the upward extending edge portion 35 in the front end wall 27. A zipper 36 extends from the top of the integral hinge formed by the fold at the upward extending edge portion 35 and around the door 30 and doorway 31 to the bottom of the integral hinge. Thus, the zipper 36 extends around a corner defined by the connection of front end wall 27 to the first side wall 26 of the outer covering 6.

Figure 3:
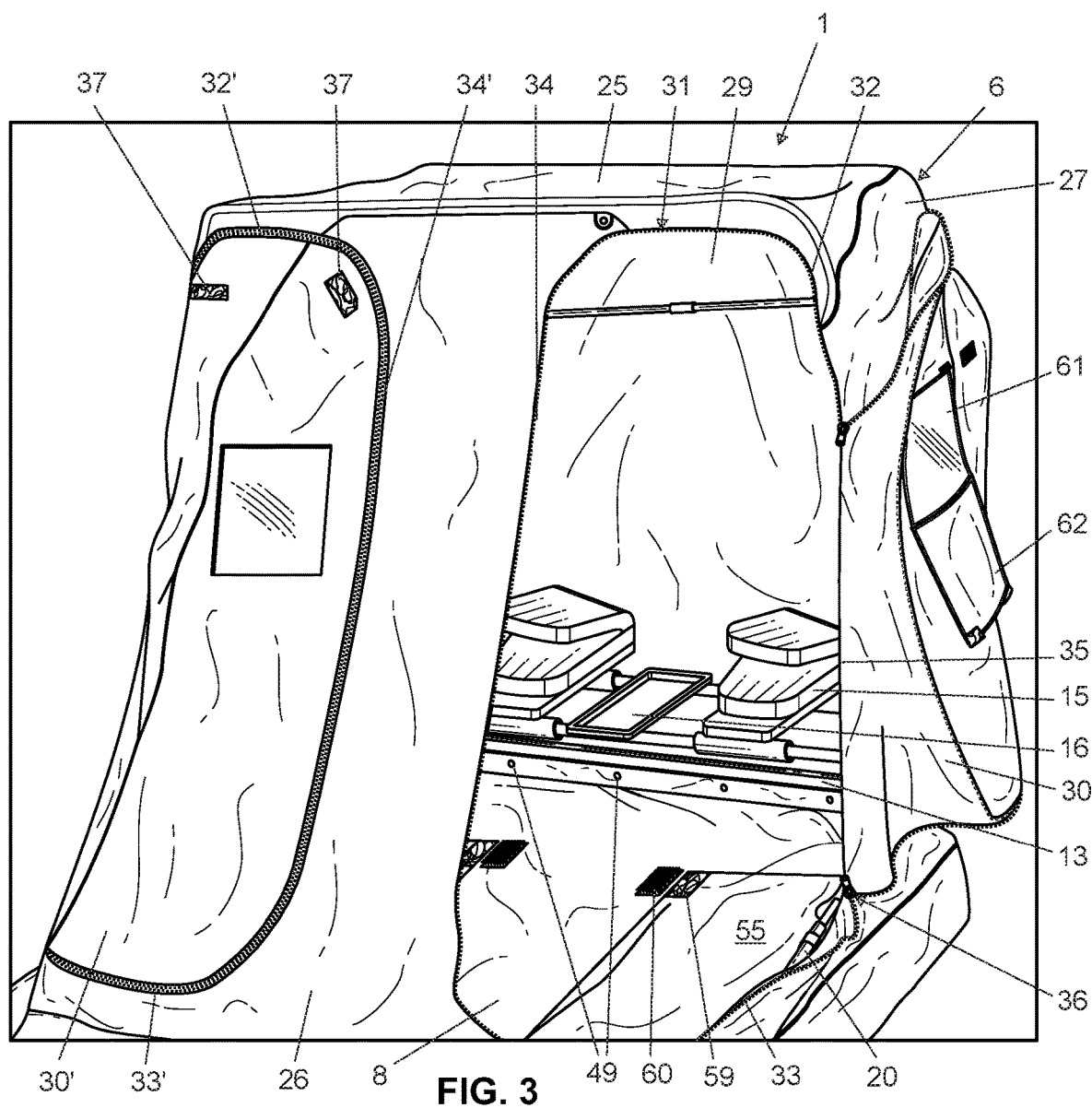
FIG. 3 is a perspective view of the example shelter and removable floor of FIGS. 1-2, showing the removable floor connected to the sled of the portable shelter and connected to a flip-over frame assembly of the portable shelter, as well as flaps that are attached along one side and that cover openings in the removable floor.
Figure 4:
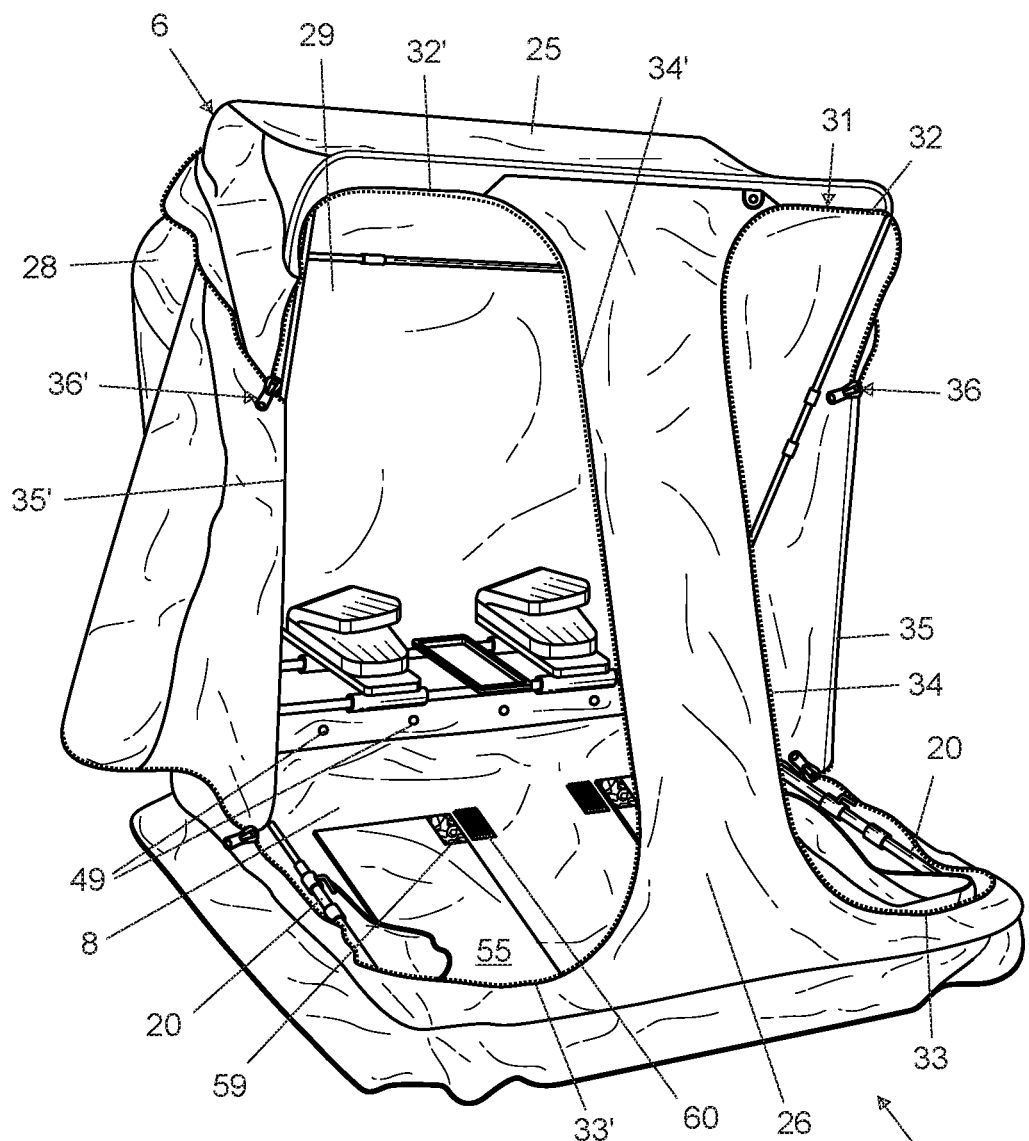
FIG. 4 is a perspective view of the example shelter and removable floor of FIGS. 1-3, showing the first opening and removable floor, as well as a second opening that spans across a portion of the first side wall and a portion of the rear end wall.
Figure 5:
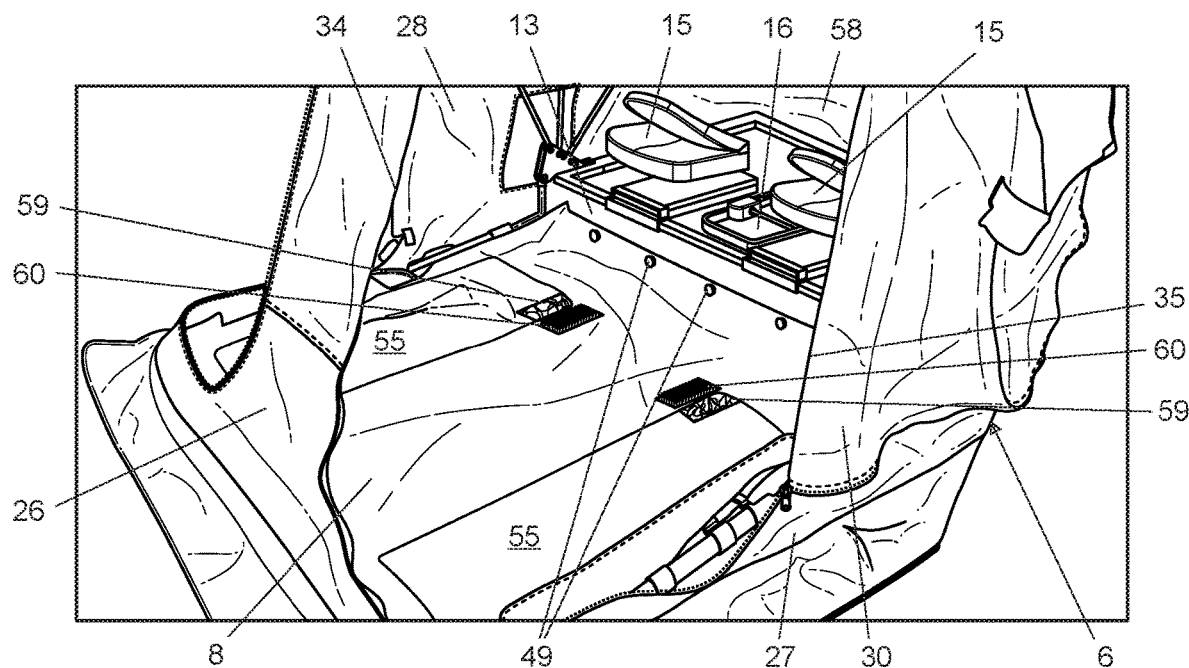
FIG. 5 is perspective view of the example shelter of FIGS. 1-4 showing both the first and second openings and the removable floor.

As can be seen in FIGS. 3-5, the flip-over frame assembly 4 supports the outer covering 6 without obstructing the doorway 31. The unique doorway 31 advantageously provides a significantly larger opening for ease of ingress and egress both in the direction of the first side wall 26 and the front end wall 27. This is further enhanced by the outer surface of the door 30 having at least one fastener 37 that can be selectively connected to at least one fastener 38 on the front end wall 27 of the outer covering 6 to hold the door 30 in an open position, as will be appreciated by viewing the similar first and second doors 30, 30' shown in FIGS. 1-4, which may be held open against the front and rear end walls 27, 28. Indeed, the second door 30' is at a second doorway 31' that is defined by an opening having upper and lower edge portions 32', 33' extending from a second upward extending edge portion 34' in the first side wall 26 to an upward extending edge portion 35' in the rear end wall 28. A zipper 36' extends from the top of the integral hinge formed by the fold at the upward extending edge portion 35' and around the door 30' and doorway 31' to the bottom of the integral hinge. Thus, the zipper 36' extends around a corner defined by the connection of rear end wall 28 to the first side wall 26 of the outer covering 6.

It will be appreciated that FIGS. 10-16 show a second example flip-over portable shelter 101. The outer covering 106 includes a top wall 125, an upward extending first side wall 126 that extends from the ground engaging frame member 120 to the top wall 125, upward extending front and rear end walls 127, 128 that each extend from the ground engaging frame member 120 to the top wall 125, and an upward extending second side wall 129 that extends from the sled 2 to the top wall 125. The flip-over portable shelter 101 and its outer covering 106 are shown in a somewhat simplified manner for convenience and ease of viewing, and are intended to differ from the first example shelter 1 only with respect to the configuration of the doors 130, 130', doorways 131, 131' and way the doors 130, 130' are held in an open position. Thus, the second example shelter 101 uses the same sled 2 and flip-over frame assembly 4, but as seen in FIGS. 11-16, for example, the outer covering 106 includes doors 130, 130' at doorways 131, 131' that are defined by an opening having upper edge portions 132, 132' and lower edge portions 133, 133' extending from upward extending edge portions 134, 134' in the first side wall 126 to an upward extending edge portion in the front end wall 127 and an upward extending edge portion 135' in the rear end wall 128. The main difference is that the doors 130, 130' are connected to the doorways 131, 131', respectively, in the first side wall 126. Thus, the doors 130, 130' are constructed as flaps connected to the outer covering 106 via a respective fold or integral hinge in the outer covering 106 at the upward extending edge portions 134, 134' in the first side wall 126. A zipper 136, 136' extends from the top of the integral hinge formed by the fold at the upward extending edge portion 134, 134' and around the door 130, 130' and doorway 131, 131', to the bottom of the integral hinge. As such, the zipper 136, 136' extends around a corner defined by the connection of the front end wall 127 to the first side wall 126, and rear end wall 128 to the first side wall 126, respectively.

Figure 13:
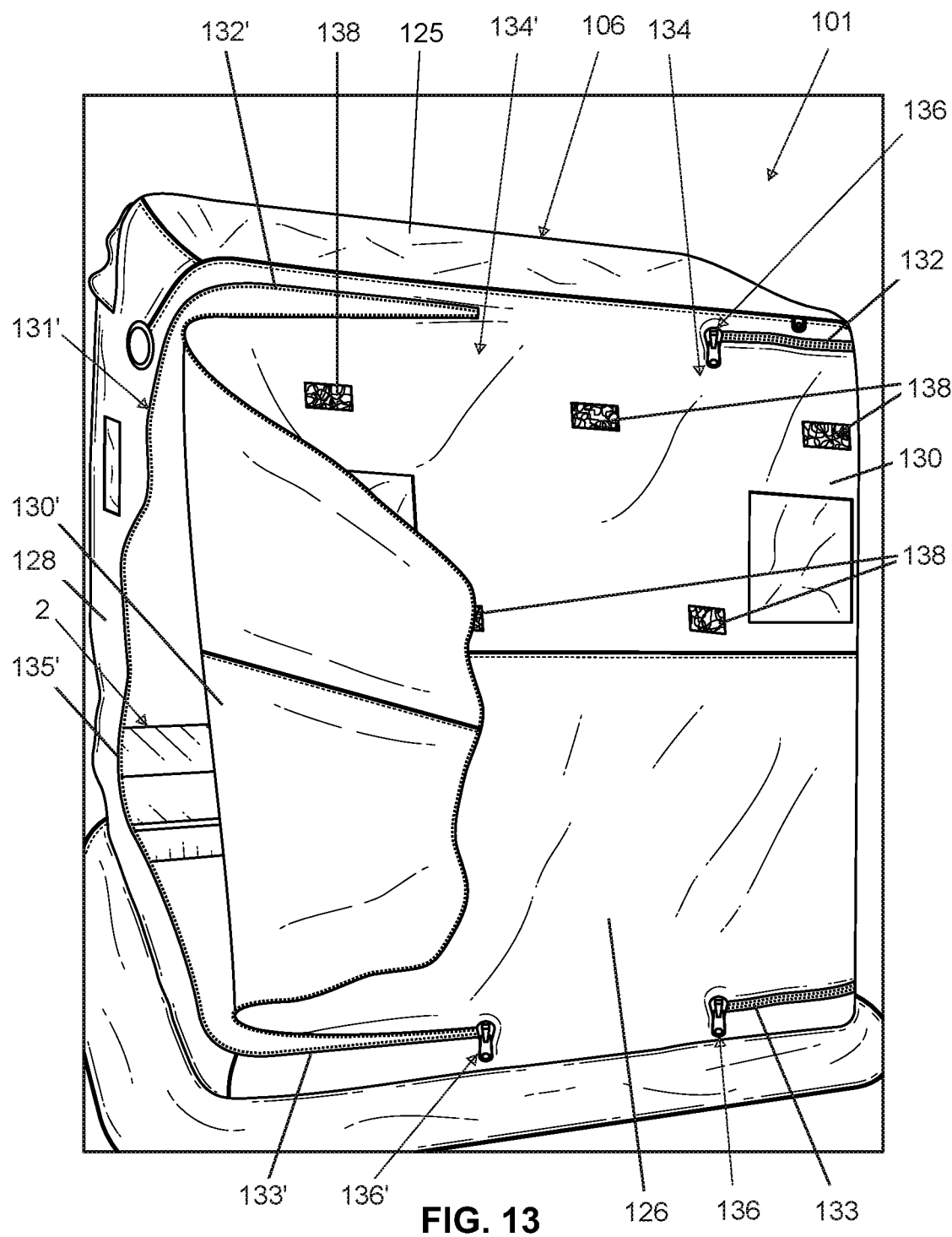
FIG. 13 is perspective view of the second example shelter of FIGS. 11-12 showing the door being folded back on itself a first time and connected to the first side wall of the shelter, but for ease of viewing, showing the sled in a simplified manner and without showing the frame assembly and removable floor.
Figure 14:
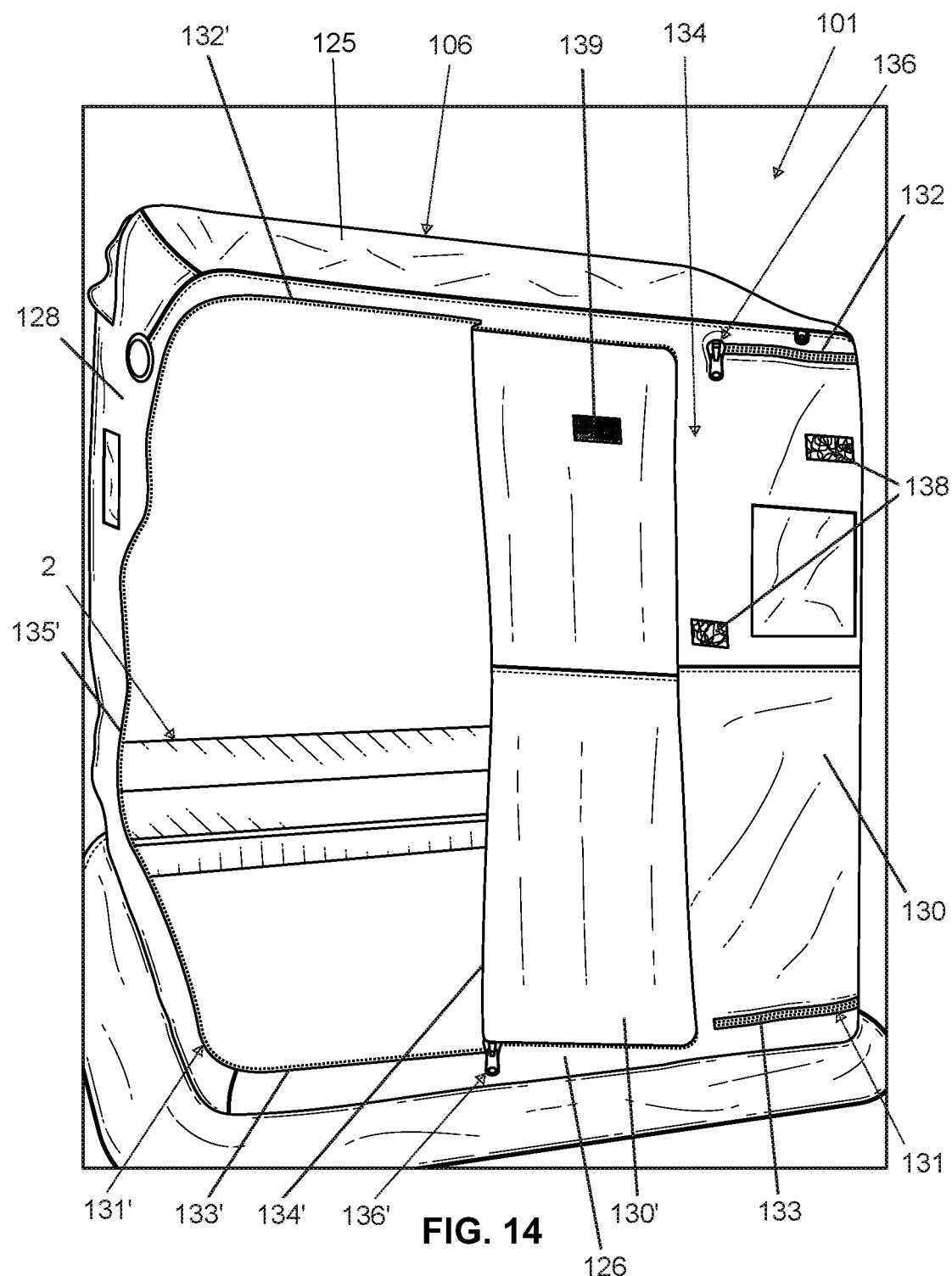
FIG. 14 is a perspective views of the second example shelter of FIGS. 11-13 showing the door being folded back on itself a second time and connected to the first side wall of the shelter without obstructing the open doorway, but for ease of viewing, showing the sled in a simplified manner and without showing the frame assembly and removable floor.
Figure 15:
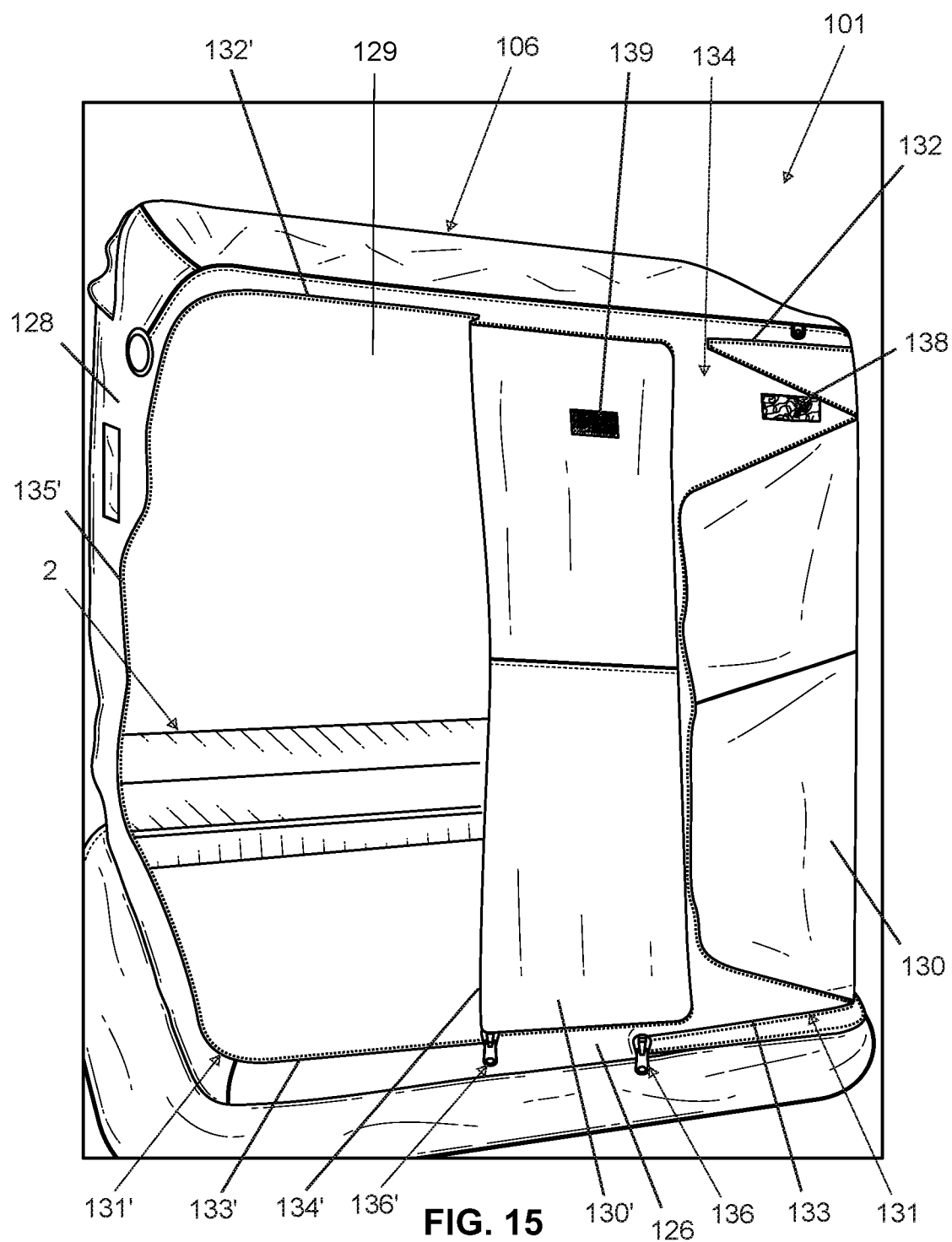
FIG. 15 is a perspective view of the second example shelter of FIGS. 11-14 showing the second door being folded back on itself a first time and connected to the first door that has been connected to the first side wall of the shelter, but for ease of viewing, showing the sled in a simplified manner and without showing the frame assembly and removable floor.
Figure 16:
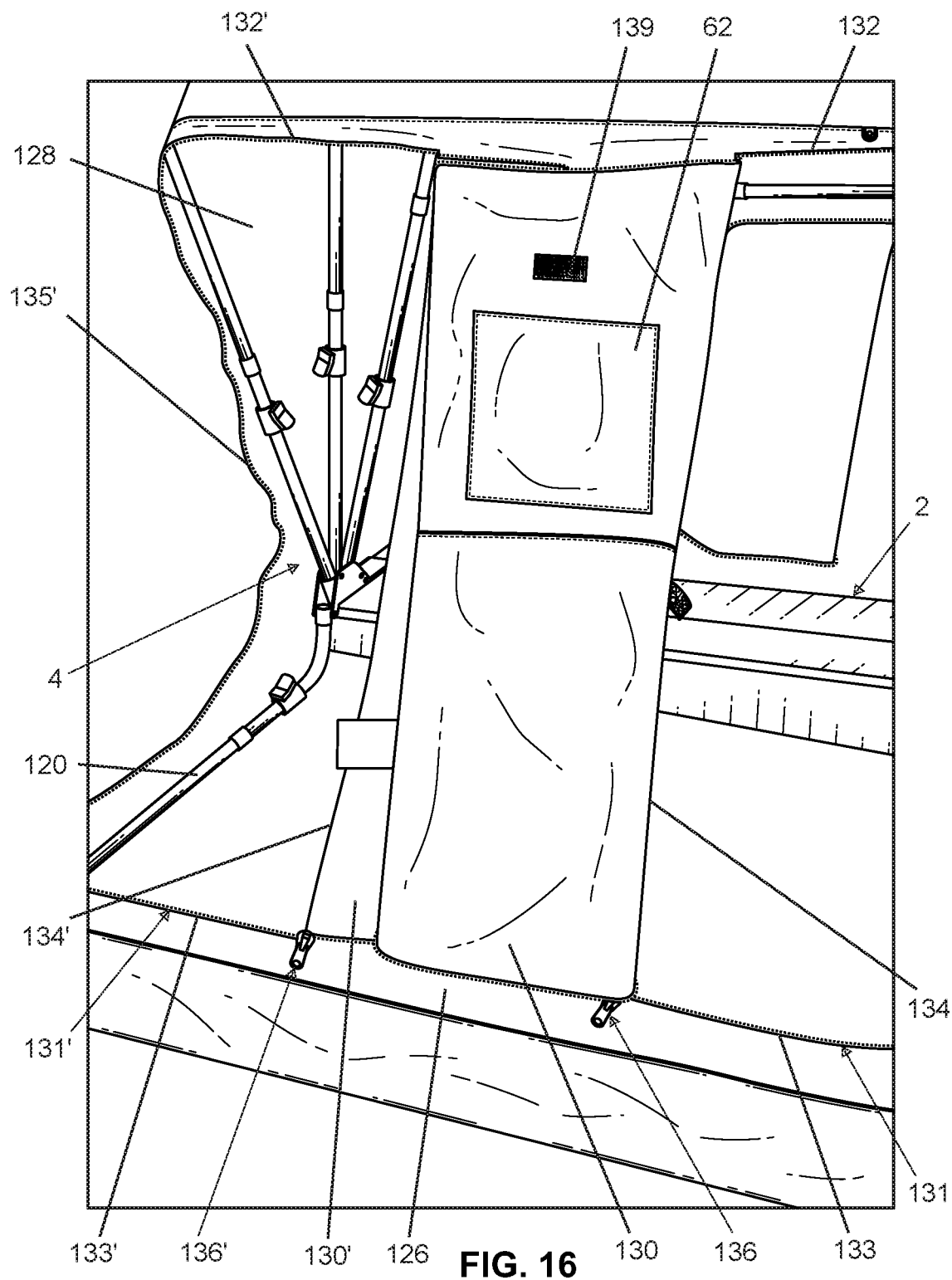
FIG. 16 is a perspective view of the second example shelter of FIGS. 11-15 showing the second door being folded back on itself a second time and connected to the first door that has been connected to the first side wall of the shelter without obstructing the second open doorway, but for ease of viewing, showing the sled in a simplified manner and without showing the removable floor.

The doors 130, 130' of the second example shelter 101 include at least one fastener 137 on an outer surface of the doors 130, 130', which can be selectively connected to at least one fastener 138 on the first side wall 126 of the outer covering 106 to hold the door 130 in an open position. Given the narrow remaining portion of the first side wall 126 between the doors 130, 130', the doors 130, 130' may be folded back on themselves a first time, as seen in FIGS. 13 and 15, to connect to the first side wall 126 and a second time, as seen in FIGS. 14 and 16, to provide more orderly folded positions that will not obstruct ingress or egress through the doorways 131, 131'. At least one further fastener 139 is provided on the inside surface of each door 130, 130' to permit a second door to be held open against a first door, as will be appreciated in FIGS. 15-16.

Each of the flip-over portable shelters 1, 101 includes another inventive aspect in that they are shown with an optional removable floor 8. When the shelter 1, 101 is in an erected position, the removable floor 8 is connected to the sled 2 and to the ground engaging frame member 20. The removable floor 8 includes a central section 41 defining a ground engaging area and having at least an upper layer 42 constructed of a non-permeable material and having an upper surface, and a lower layer 43 constructed of a non-permeable material and having a ground engaging lower surface.

The central section 41 of the removable floor 8 is connected to upward extending opposed front and rear end walls 44, 45 and to upward extending opposed first and second side walls 46, 47. The upward extending opposed front and rear end walls 44, 45 and upward extending opposed first and second side walls 46, 47 of the removable floor 8 further include at least one layer 48 constructed of a non-permeable material.

The upward extending first side wall 46 of the removable floor 8 also includes at least one outward facing fastener 49 configured to be connected to at least one respective outward facing fastener 50 on the upward extending first side wall 13 of the sled 2. It will be appreciated from FIGS. 3, 6 and 10A that the at least one outward facing fastener 49 of the upward extending first side wall 46 of the removable floor 8 and respective at least one outward facing fastener 50 of the upward extending first side wall 13 of the sled 2 are configured as a releasable snap, and a plurality of such fasteners 49 may be used to securely releasably connect the removable floor 8 to a plurality of respective fasteners 50 on the sled 2.

Figure 10A:
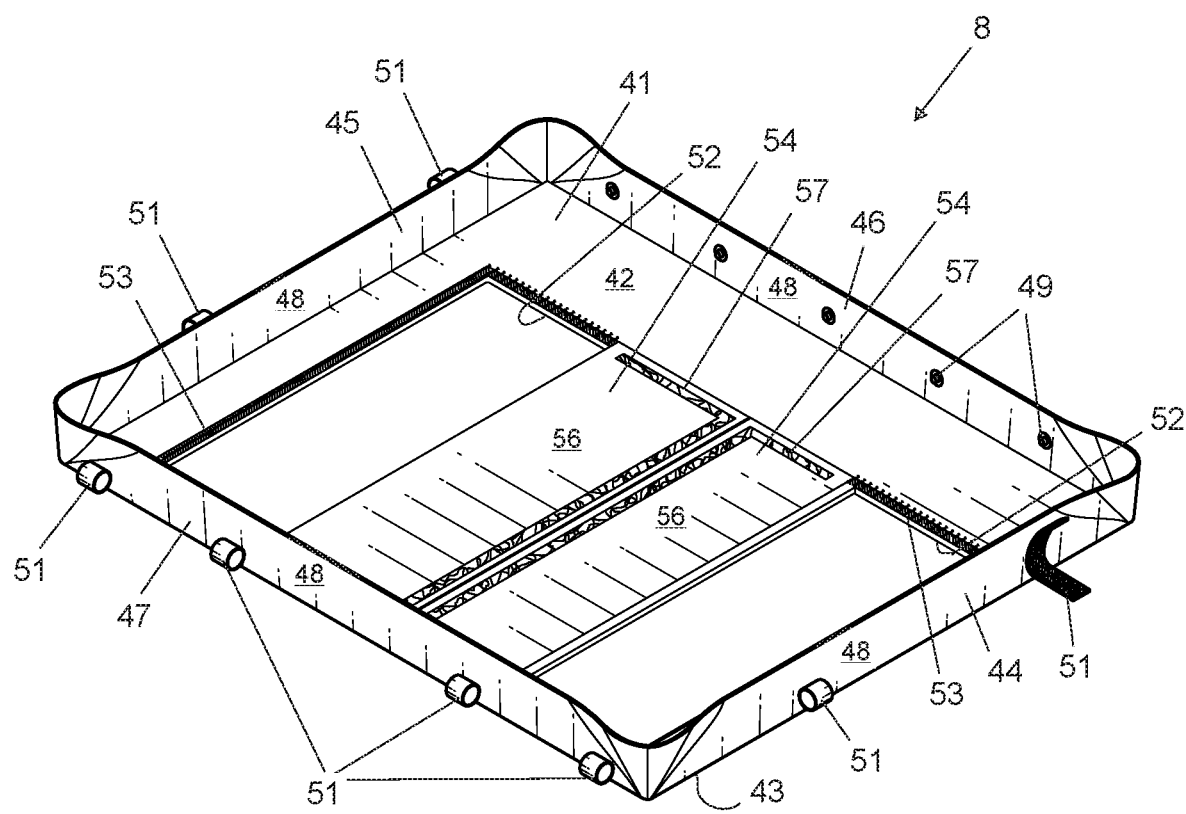
FIG. 10A is a perspective view of the portable shelter of FIGS. 1-9 showing the floor flaps in an open position.

Each of the upward extending opposed front and rear end walls 44, 45 and the upward extending second side wall 47 of the removable floor 8 includes at least one fastener 51 configured to be connected to the ground engaging frame member 20 of the flip-over frame assembly 4. As seen in FIGS. 8 and 10A, the at least one fastener 51 on each of the upward extending opposed front and rear end walls 44, 45 and the upward extending second side wall 47 of the removable floor 8 may be configured as a releasable hook and loop fastener, or other suitable releasable fastener, and a plurality of such fasteners 51 may be used to keep the removable floor 8 spread out and in the desired position.

The central section 41 of the removable floor 8 also includes at least one opening 52 defined by an area where the upper layer 42 is sealed to the lower layer 43, such as by welding, adhesive or other suitable means. A central section fastener 53 is connected to the upper surface of the upper layer 42 of the central section 41 and is located proximate the at least one opening 52. At least one patch 54 includes at least one layer constructed of a non-permeable material having an upper surface 55 and a lower surface 56. The at least one patch 54 also has a patch fastener 57 connected to the lower surface 56 of the at least one patch 54 and releasably connected to the central section fastener 53 located proximate the at least one opening 52. This construction helps avoid having permanently exposed openings that can promote melting of underlying ice and pooling of water. It also avoids the need for a user to cut and reseal edges of an opening in the floor, which could be difficult and/or lead to errors that may cause water intrusion between layers that could result in a reduction of the insulation properties of the floor or difficulty handling a floor that has taken on water. Thus, the precut and sealed openings 52 and patches 54 resist melting of the ice below the shelter while providing selective access to the ice for fishing, and resist water intrusion both between layers and on top of the removable floor.

Figure 10B:
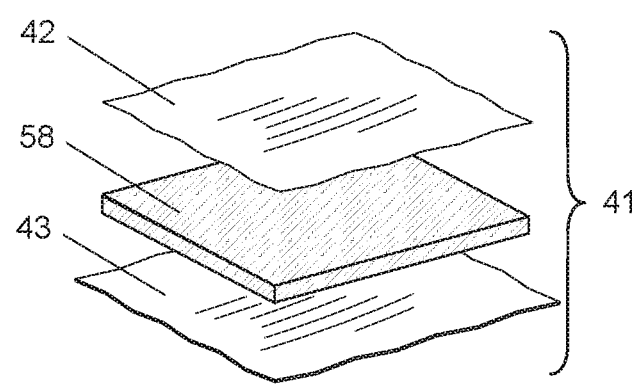
FIG. 10B is a perspective exploded view of an example portion of the central section of the removable floor shown in FIG. 10A.
Figure 11:
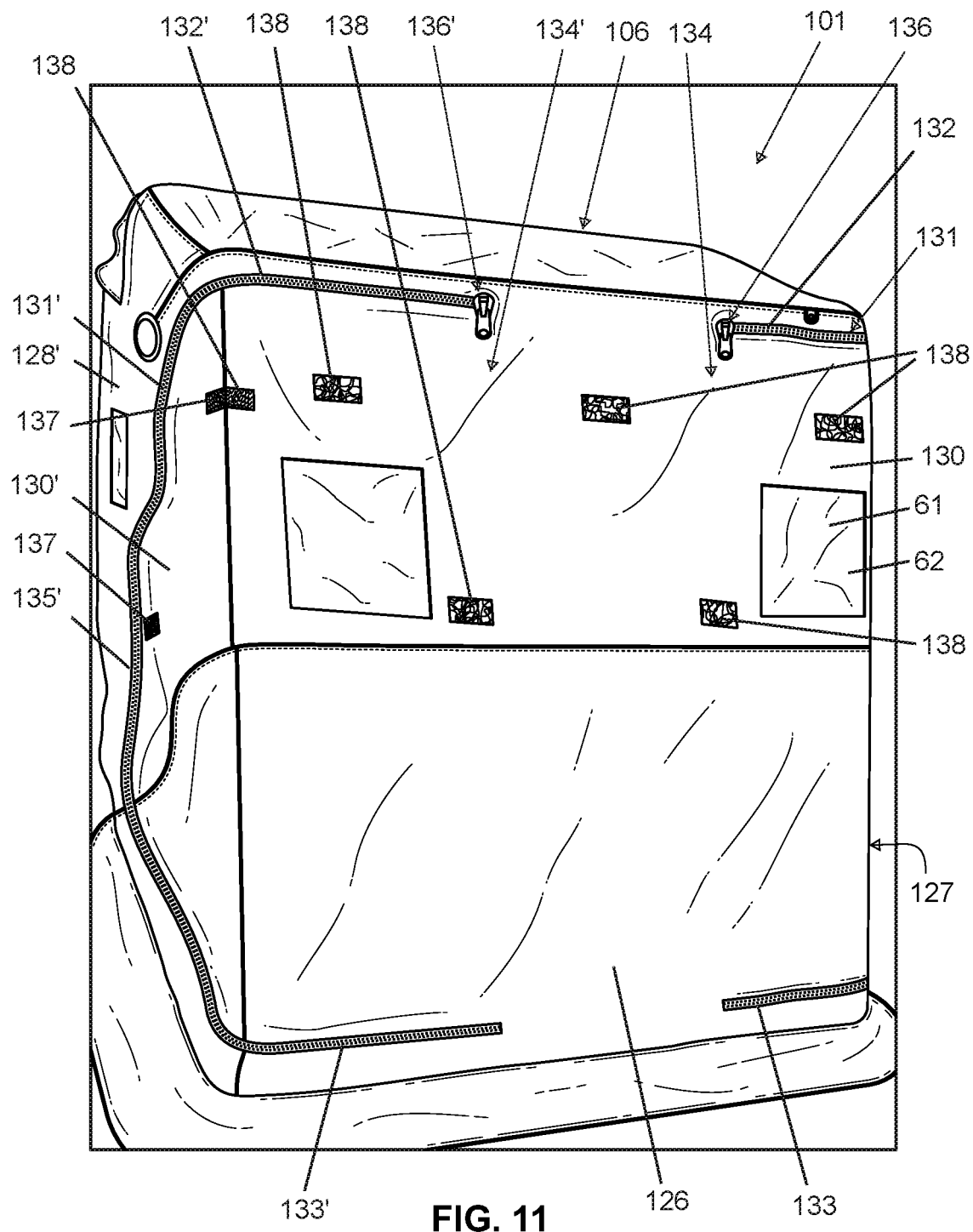
FIG. 11 is a perspective view of a second example flip-over portable shelter having a sled, being erected, and showing doorway openings that may be opened and held open in an alternative manner to that shown in the first example.
Figure 12:
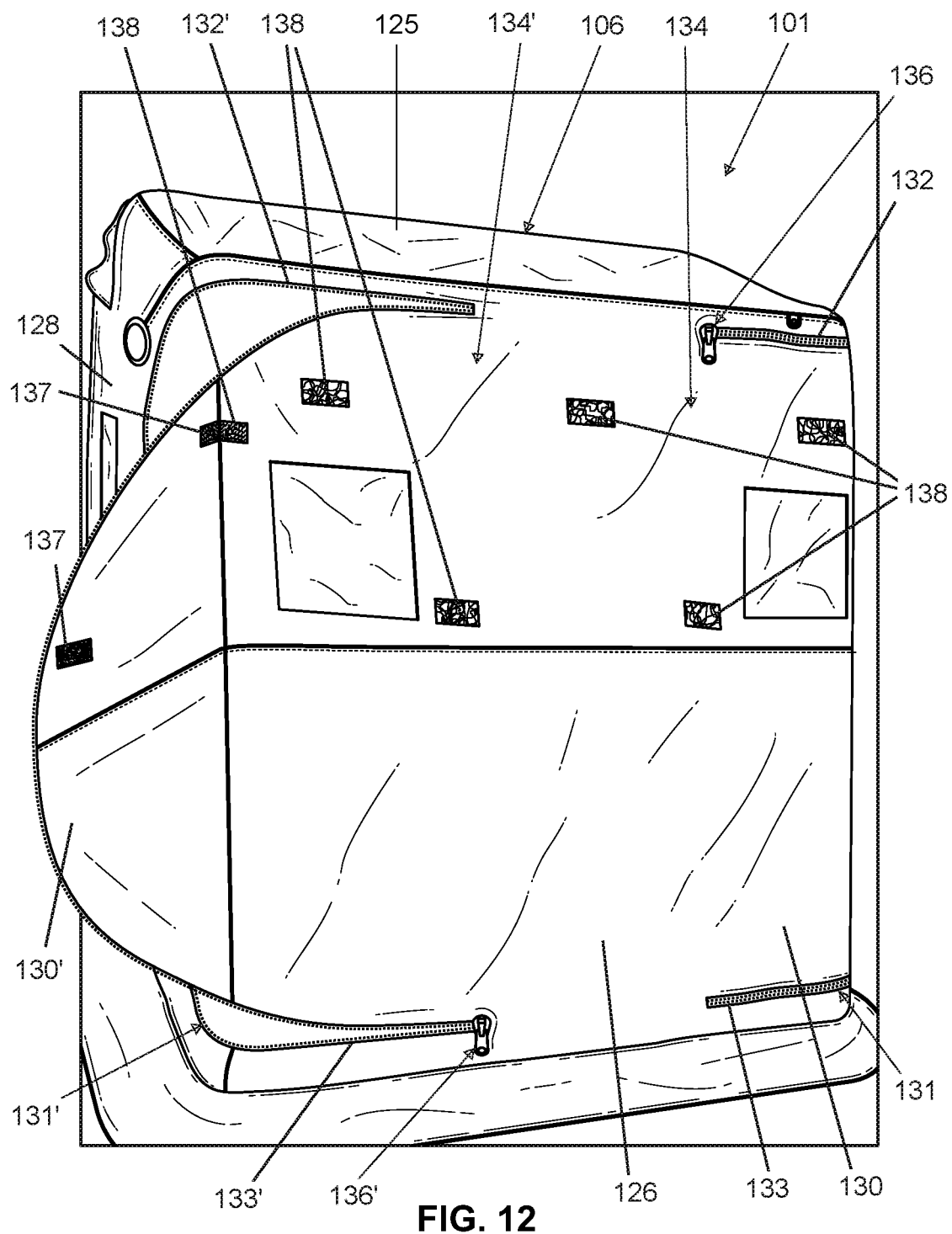
FIG. 12 is perspective view of the second example shelter of FIG. 11 showing one of the doors in a partially open position, but for ease of viewing, showing the sled in a simplified manner and without showing the frame assembly and removable floor.

The non-permeable material used for the removable floor 8 may be any suitable sheet material constructed of, for example, plastic vinyl or rubber, and preferably is a flame retardant polyvinyl chloride (FR PVC) sheet material, although it will be appreciated that other non-permeable materials may be used. As seen in FIG. 10B, the central section 41 of the removable floor 8 preferably includes an intermediate layer 58 located between the upper layer 42 and lower layer 43. The intermediate layer 58 preferably is constructed of an insulation material, such as a single-ply polyethylene (PE) foam sheet material, although it will be appreciated that other insulation materials may be used. Each of the upward extending opposed front and rear end walls 44, 45 and upward extending opposed first and second side walls 46, 47 of the removable floor 8 preferably include at least two layers of the same non-permeable material as is used in the central section 41, and they preferably are connected at the corners of the removable floor 8.

The at least one patch 54 is used to cover the at least one opening 52 when a user does not wish to have access to the ice below the flip-over portable shelter 1, 101. For convenience, the at least one patch 54 may be fixedly connected to the central section 41 along one edge portion of the at least one patch 54. The at least one patch fastener 57 may extend around the other edge portions of the patch to releasably connect to the central section fastener 53 when the patch 54 closes the opening 52. To hold the patch 54 in an open position, as seen in FIG. 10A, a second patch fastener 59 is located on the upper surface 55 of the patch 54 and may be connected to a second central section fastener 60 located on the upper surface of the upper layer 42 of the central section 41. It will be appreciated that the central section fastener 53 and respective patch fastener 57 may be of a hook and loop or other suitable construction. Similarly, the second patch fastener 59 and second central section fastener 60 may be of a hook and loop or other suitable construction.

To selectively permit light into the flip-over portable shelters 1, 101, the outer covering 6, 106 also may include in any of the top wall 25, front and rear end walls 27, 28, and/or first and second side walls 26, 29, one or more windows 61 constructed of a transparent material or a non-transparent flap 62 that may extend over an opening in a side wall, or both may be employed.

From the above disclosure, it will be apparent that flip-over portable shelters constructed in accordance with this disclosure may include a number of structural aspects that provide numerous advantages. The example aspects of an enlarged door opening that extends around a corner and into two adjacent walls, as well as a removable floor shown herein, may exhibit one or more of the above-referenced potential advantages, depending upon the specific design chosen.

It will be appreciated that flip-over portable shelters constructed in accordance with the present disclosure may be provided in various configurations. Any variety of suitable materials of construction, configurations, shapes and sizes for the components and methods of connecting the components of the shelters may be utilized to meet the particular needs and requirements of an end user. It is to be understood that the invention is not to be limited to the disclosed example embodiments, but rather, is intended to cover various modifications and equivalent arrangements included within the spirit and scope of the appended claims. Thus, the description and drawings should be considered illustrative and not restrictive of the invention, which is limited only by the appended claims and their legal equivalents.

The invention claimed is:

1. A flip-over portable shelter, comprising:
   a sled;
   the sled further comprising a bottom being connected to upward extending opposed front and rear end walls and to upward extending opposed first and second side walls;
   a flip-over frame assembly;
   the flip-over frame assembly further comprising a plurality of frame members being pivotally connected to the sled, at least one of which is a ground engaging frame member;
   the plurality of frame members being moveable from a collapsed position overlying the sled to an erected position defining a space that is over the sled and extends outward from the sled in a first direction beyond the upward extending first side wall of the sled to the ground engaging frame member;
   an outer covering;
   the outer covering being connected to the flip-over frame assembly and enclosing the sled and the space defined by the flip-over frame assembly when the flip-over frame assembly is in the erected position;
   the outer covering further comprising a top wall, an upward extending first side wall that extends from the ground engaging frame member to the top wall, upward extending front and rear end walls that extend from the ground engaging frame member to the top wall and an upward extending second side wall that extends from the sled to the top wall, and further including a door at a doorway that is defined by an unobstructed opening having an upper edge portion spaced downward from and being substantially parallel to the top wall and a lower edge portion spaced upward from and being substantially parallel to the ground engaging frame member, wherein the upper edge portion and lower edge portion extend from an upward extending edge portion in the first side wall to an upward extending edge portion in the front end wall;
   a removable floor; and
   the removable floor being connected to the sled via fasteners on the upward extending first side wall of the sled that removably engage respective fasteners on the removable floor and via fasteners on the removable floor that are configured to be connected to the ground engaging frame member.

2. The flip-over portable shelter in accordance with claim 1, wherein the door is connected to the doorway in the outer covering at the upward extending edge portion in the front end wall or at the upward extending edge portion in the first side wall.

3. The flip-over portable shelter in accordance with claim 2, wherein the door is a flap connected to the outer covering via a vertically extending integral hinge at the upward extending edge portion in the front end wall or at the upward extending edge portion in the first side wall, and a zipper extends from the top of the integral hinge and around the door and doorway to the bottom of the integral hinge.

4. The flip-over portable shelter in accordance with claim 3, wherein the zipper extends around a corner defined by the connection of the front end wall to the first side wall of the outer covering.

5. The flip-over portable shelter in accordance with claim 1, wherein the door has an outer surface and further comprises at least one fastener on the outer surface that connects to at least one fastener on an outer surface of the front end wall or on an outer surface of the first side wall of the outer covering and holds the door in an open position.

6. The flip-over portable shelter in accordance with claim 1, further comprising a second door at a second doorway that is defined by a second opening having upper and lower edge portions extending from a second upward extending edge portion in the first side wall to an upward extending edge portion in the rear end wall.

7. The flip-over portable shelter in accordance with claim 1, wherein the removable floor further comprises a central section defining a ground engaging area and the central section being connected to upward extending opposed front and rear end walls and to upward extending opposed first and second side walls.

8. The flip-over portable shelter in accordance with claim 7, wherein the central section of the removable floor further comprises an upper layer constructed of a non-permeable material and having an upper surface, a lower layer constructed of a non-permeable material and having a ground engaging lower surface, and at least one intermediate layer located between the upper layer and the lower layer and being constructed of an insulation material.

9. A flip-over portable shelter, comprising:
a sled:
the sled further comprising a bottom being connected to upward extending opposed front and rear end walls and to upward extending opposed first and second side walls, with the upward extending first side wall of the sled further comprising at least one outward facing fastener;
a flip-over frame assembly;
the flip-over frame assembly further comprising a plurality of frame members being pivotally connected to the sled, at least one of which is a ground engaging frame member;
the plurality of frame members being moveable from a collapsed position overlying the sled to an erected position defining a space that is over the sled and extends outward from the sled in a first direction beyond the upward extending first side wall of the sled to the ground engaging frame member;
an outer covering;
the outer covering being connected to the flip-over frame assembly and enclosing the sled and the space defined by the flip-over frame assembly when the flip-over frame assembly is in the erected position;
a removable floor;
the removable floor further comprising a central section defining a ground engaging area and comprising a non-permeable material and having an upper surface and having a ground engaging lower surface;
the central section of the removable floor being connected to upward extending opposed front and rear end walls and to upward extending opposed first and second side walls;
the upward extending opposed front and rear end walls and upward extending opposed first and second side walls of the removable floor further comprising a non-permeable material;
the upward extending first side wall of the removable floor further comprising at least one outward facing fastener configured to be connected to the respective at least one outward facing fastener of the upward extending first side wall of the sled; and
each of the upward extending opposed front and rear end walls and the upward extending second side wall of the removable floor further comprising at least one fastener configured to be connected to the ground engaging frame member of the flip-over frame assembly.

10. The flip-over portable shelter in accordance with claim 9, wherein the at least one outward facing fastener of the upward extending first side wall of the removable floor and respective at least one outward facing fastener of the upward extending first side wall of the sled are configured as a releasable snap.

11. The flip-over portable shelter in accordance with claim 9, wherein the at least one fastener on each of the extending opposed front and rear end walls and the upward extending second side wall of the removable floor further comprises a hook and loop fastener.

12. The flip-over portable shelter in accordance with claim 9, wherein the at least one outward facing fastener of the upward extending first side wall of the sled further comprises a plurality of fasteners.

13. The flip-over portable shelter in accordance with claim 12, wherein the at least one outward facing fastener of the upward extending first side wall of the removable floor further comprises a plurality of fasteners that are configured to be releasably connected to the plurality of fasteners of the upward extending first side wall of the sled.

14. The flip-over portable shelter in accordance with claim 9, wherein the central section of the removable floor further comprises at least an upper layer constructed of a non-permeable material and having an upper surface, a lower layer constructed of a non-permeable material and having a ground engaging lower surface, and at least one intermediate layer located between the upper layer and the lower layer and being constructed of an insulation material.

15. The flip-over portable shelter in accordance with claim 14, wherein the central section of the removable floor further comprises at least one opening defined by an area where the upper layer is sealed to the lower layer, and a central section fastener is connected to the upper surface of the upper layer of the central section and is located proximate the at least one opening; and at least one patch having an upper surface and a lower surface, and having a patch fastener connected to the lower surface of the patch and being releasably connected to the central section fastener located proximate the at least one opening.

16. The flip-over portable shelter in accordance with claim 15, wherein the at least one patch is fixedly connected to the central section along one edge portion of the at least one patch.

17. The flip-over portable shelter in accordance with claim 9, wherein each of the upward extending opposed front and rear end walls and upward extending opposed first and second side walls of the removable floor further comprise at least two layers constructed of non-permeable material.

18. The flip-over portable shelter in accordance with claim 9, wherein the outer covering further comprises a top wall, an upward extending first side wall that extends from the ground engaging frame member to the top wall, upward extending front and rear end walls that extend from the ground engaging frame member to the top wall, an upward extending second side wall that extends from the sled to the top wall, and a door at a doorway that is defined by an opening having upper and lower edge portions extending from an upward extending edge portion in the first side wall to an upward extending edge portion in the front end wall.

19. The flip-over portable shelter in accordance with claim 18, wherein the door is connected to the doorway in the outer covering at the upward extending edge portion in the front end wall or at the upward extending edge portion in the first side wall.

\* \* \* \* \*